United States Patent
de Goede

(10) Patent No.: US 8,856,407 B2
(45) Date of Patent: *Oct. 7, 2014

(54) USB REDIRECTION FOR WRITE STREAMS

(75) Inventor: Hans de Goede, Delft (NL)

(73) Assignee: Red Hat, Inc., Raleigh, NC (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/303,287

(22) Filed: Nov. 23, 2011

(65) Prior Publication Data

US 2013/0132620 A1    May 23, 2013

(51) Int. Cl.
G06F 13/00    (2006.01)
G06F 13/10    (2006.01)
G06F 3/00    (2006.01)

(52) U.S. Cl.
CPC .................................. *G06F 13/105* (2013.01)
USPC .................. 710/53; 710/35; 710/60

(58) Field of Classification Search
USPC .......................................... 710/53
See application file for complete search history.

(56) References Cited

U.S. PATENT DOCUMENTS

| 7,000,035 B1 * | 2/2006 | Uchizono et al. ............ 710/2 |
| 8,121,035 B2 * | 2/2012 | Oh et al. ................ 370/235 |
| 2011/0173353 A1 * | 7/2011 | Bauman et al. .......... 710/28 |

* cited by examiner

*Primary Examiner* — Henry Tsai
*Assistant Examiner* — Dean Phan
(74) *Attorney, Agent, or Firm* — Lowenstein Sandler LLP

(57) ABSTRACT

Methods and systems for conducting a transaction between a USB device and a virtual USB device driver are provided. A client USB manager stores in a buffer one or more data packets associated with the virtual USB device driver. The client USB manager dequeues one of the one or more data packets from the buffer. The client USB manager transmits the dequeued data packet to the USB device for processing. The client USB manager re-fills completed data packets from the buffer and queues the data packets for transmitting to the USB device without waiting for the virtual USB device driver.

22 Claims, 5 Drawing Sheets

USB REDIRECTION FOR WRITE STREAMS

TECHNICAL FIELD

Embodiments of the present invention relate to a computer system, and more specifically, to a method and apparatus for implementing local and remote write streams of universal serial bus (USB) devices in a virtualized computing environment.

BACKGROUND

Universal Serial Bus (USB) is an industry standard that defines the cables, connectors and protocols used for connection, communication and power supply between computers and electronic devices. USB was designed to standardize the connection of computer peripherals, such as keyboards, pointing devices, digital cameras, printers, portable media players, disk drives and network adapters to personal computers, both to communicate and to supply electric power. It was designed not to require specific interrupt or DMA resources, and also to be 'hot-pluggable'.

A USB host controller (i.e., a USB host, e.g., in a personal computer) communicates with a USB device (e.g., a printer). USB device communication is based on pipes (logical channels). A pipe is a connection from the USB host controller to a logical entity, found on a USB device, and named an endpoint. Each USB device has one or more endpoints. Each endpoint is a source or sink of data. Data may flow OUT from the USB host to a USB device, or IN from the USB device to the USB host. USB devices talk to the USB host through four different types of USB transfers: control, bulk, isochronous, and interrupt transfers.

Isochronous transfers are data transfers at some guaranteed data rate (often, but not necessarily, as fast as possible) but with possible data loss. Error-free delivery is not guaranteed. Isochronous transfers are employed primarily in applications such as audio data streaming, where it is important to maintain the data flow, but not so important if some data is missed or corrupted. An isochronous transfer uses either an IN transaction or an OUT transaction depending on the type of endpoint. One feature of these transactions is that there is no handshake packet at the end. Isochronous transfers occur continuously and periodically (e.g., 8000 times per second).

Interrupt transfers are data transfers for devices that need guaranteed quick responses (bounded latency). Interrupt transfers are employed to keep up to date of any changes of status in a device. Examples of their use are for a mouse or a keyboard. Traditionally, interrupt requests on microcontrollers are device generated. However, under USB, if a device requires the attention of the USB host, it should wait until the USB host polls it before it can report that it needs urgent attention. An interrupt request is queued by a USB device driver until the USB host polls the USB device asking for data.

Bulk transfers are data transfers used for large bursty data. Examples include a print-job sent to a printer or an image generated from a scanner. Bulk transfers are designed to transfer large amounts of data with error-free delivery, but with no guarantee of bandwidth.

A control transfer is a bi-directional transfer that uses both an IN and an OUT endpoint. Control transfers are typically used for command and status operations, and to set up a USB device. They are typically bursty, random packets which are initiated by the host and use best effort delivery.

Control and bulk transfers do not typically have critical timing constrains, but isochronous and interrupt transfers typically do. With isochronous transfers, the USB device typically needs to be read/written to up to 8000 times per second and failing to do so may result in data loss. Normally this is handled by the Operating Systems (OS) USB stack and USB device drivers by queuing a number of packets in a USB host controller and as soon as the transfer has been received and acknowledged (i.e. processed or completed), re-queuing them.

Packet completion is signaled to the USB stack by a hardware interrupt, guaranteeing that the USB device driver will be acknowledged of packet completion with minimal latency. To minimize latency (e.g. in audio/video streams), the USB device driver queues the minimum number of packets needed to ensure reliable operation, based on the maximum latency of the USB stack and interrupt handling.

These timing constrains become a problem when redirecting USB traffic from a USB device through a virtual machine to a remote client machine over a network to which the USB device is physically connected. The packets first pass through the USB stack in the machine to which the USB device is physically connected before being passed to the USB stack in the virtual machine (i.e., the guest USB stack). This adds to latency, rendering assumptions about worst case latency invalid. When performing USB redirection to a remote client machine over a network, there is also a network latency component, worsening the latency problem. For example, when a user presses a key of a USB-connected keyboard at a remote client location, the user may perceive a noticeable time delay before seeing the resulting character appear on their terminal screen.

Conventional remedies for the network latency problem include changing the number of packets that a device driver may queue. Unfortunately, this often requires modifications to the guest USB device drivers, which is undesirable.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for conducting a transaction between a USB device and a virtual USB device driver associated with a client USB manager are described herein. In one embodiment, the client USB manager stores in a FIFO one or more data packets associated with the virtual USB device driver. The client USB manager dequeues one of the one or more data packets from the FIFO. The client USB manager transmits the dequeued data packet to the USB device for processing. When the USB device has processed the data packet, the client USB manager dequeues the next data packet from the FIFO and queues it for transmission to the USB device without waiting for the virtual USB device driver.

In an embodiment, the client USB manager receives a command packet from the virtual USB device driver to initiate an isochronous write (OUT) transaction, allocates a FIFO in response to receiving the command packet and starts filling the FIFO with data packets received from the virtual USB device driver. In an embodiment, when the FIFO has been filled with a predetermined number of packets, the client USB managers dequeues a second predetermined number of packets from the FIFO and queues the packets in a transmission queue associated with a client USB controller. In an embodiment, when the client USB manager receives a completion signal from a client USB controller, it fills one or more completed packets with data from a next packet in the FIFO, and re-queues these packets in a transmission queue.

In an embodiment, the client USB manager may receive a stop stream command associated with the virtual USB device driver. The stop stream command involves changing a USB alt setting to 0. As a result, the client USB manager terminates de-queueing packets from a FIFO and terminates queueing packets into a transmission queue.

By employing a FIFO, the USB manager ensures that the USB device receives a continuous stream of packets even if there is some jitter in the timing of packets when packets traverse a network or within a host. The FIFO is operable to continually store at least one data packet for delivery to the USB device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
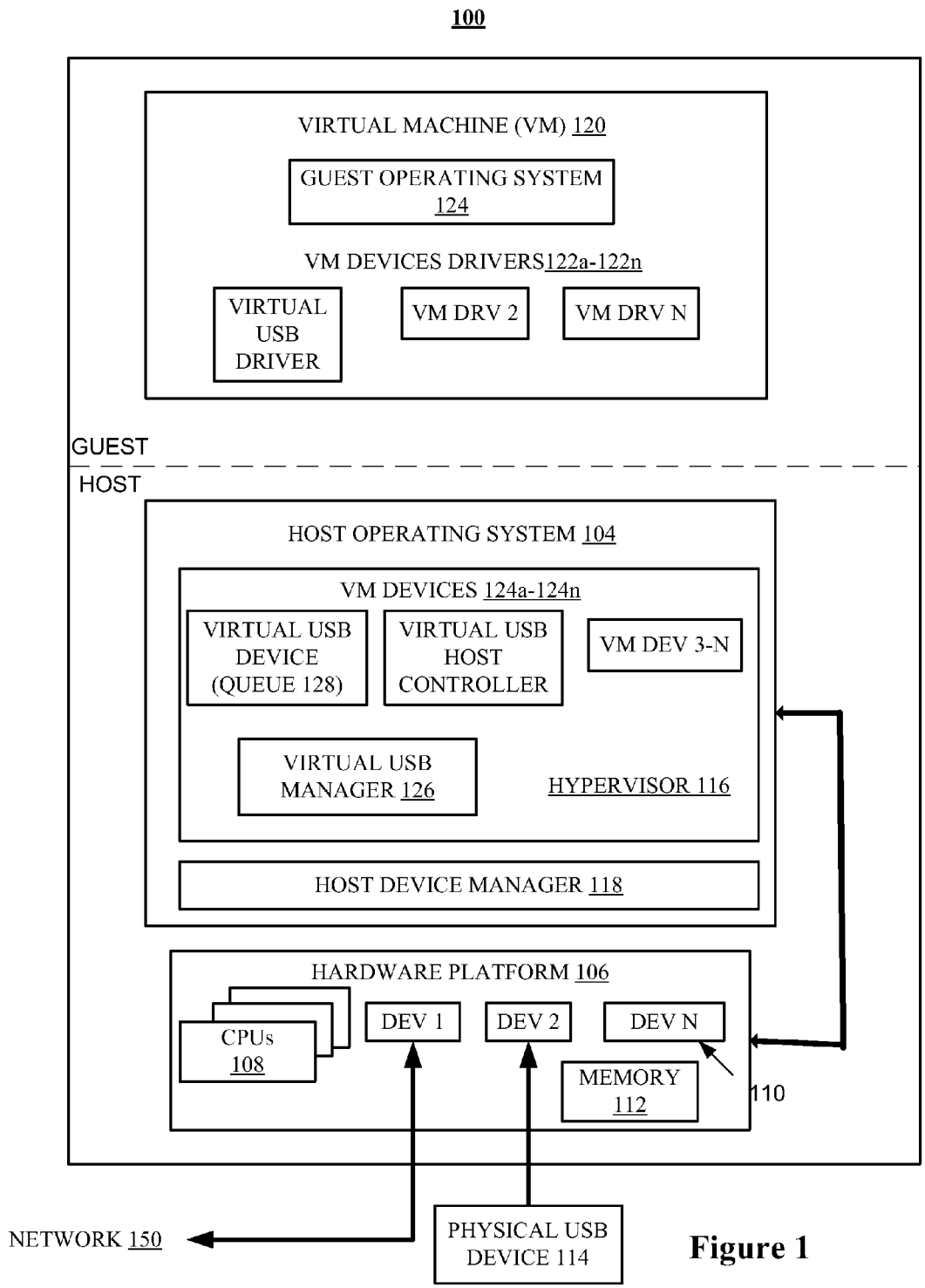
FIG. 1 is a block diagram illustrating one embodiment of a host computer system (i.e., a host) in which embodiments of the present invention may be implemented.

FIG. 1 is a block diagram illustrating one embodiment of a host computer system 100 (i.e., the host 100), in which embodiments of the present invention may be implemented. The host 100 may include a host machine such as, for example, a server computer, a gateway computer, or any other suitable computer system that is configurable for operating as a host. The host machine comprises a host operating system 104 (i.e., a host OS 104) and a hardware platform 106. Host OS 104 may include Microsoft Windows®, Linux®, Solaris®, Mac® OS or any other suitable operating system for managing operations on the host 100.

The hardware platform 106 may include one or more central processing units (CPUs) 108, devices 110, and memory 112. The devices 110 may be comprised of one or more hardware and software devices (DEV 1-DEV N), which may be located internally and externally to the host 100. An example of the devices 110 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 110 may include sound or video adaptors, photo/video cameras, printer devices, keyboards, displays, a USB host controller (e.g., DEV 2), or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB devices 114 may be externally connectable to the host 100 via the USB host controller (e.g., DEV 2) integrated with the host 100. In an embodiment, the USB host controller may be an integrated circuit (IC) separate from the one or more CPUs 108. In another embodiment, the USB host controller may be integrated with the one or more CPUs 108.

In a virtualized environment, the host 100 is additionally configured with one or more virtual machines (VMs) 120. VM 120 is a portion of software that, when executed on appropriate hardware, creates an environment that permits the virtualization of an actual physical computer system. Each of the VMs 120 may function as a self-contained platform, comprising and running a corresponding guest operating system 124 (e.g., a guest OS 124). The guest OS 124 in each of the VMs 120 may run the same or different operating systems. Similar to the host OS 104, the guest OS 124 may include Microsoft Windows®, Linux®, Solaris®, Mac® OS or any other suitable operating system for managing operations associated with a virtualization environment. A VM 120 may further comprise one or more virtual device drivers 122a-122n (i.e. VM device drivers 122a-122n) configured to control corresponding one or more virtual devices 124a-124n to be described below.

A hypervisor 116, which emulates the underlying hardware platform 106 for the VMs 120, is provided and may run on the host OS 104. A hypervisor is also known as a virtual machine monitor (VMM), a kernel-based hypervisor or a host operating system. The hypervisor 116 may support multiple VMs 120 residing on the host 100. Alternatively, more than one hypervisor 116 (not shown) may be provided to support multiple VMs 120 residing on the host 100. A host device manager 118 manages the (real) devices 110 of the host 100. The hypervisor 116 is configured to emulate the one or more virtual devices 124a-124n in cooperation with the virtual device drivers 122a-122n residing on a virtual machine 120.

In one embodiment, one of the virtual devices 124a-124n emulated by the hypervisor 116 may be a virtual USB device 124a which is configured to communicate with a virtual USB host controller 124b under the control of a virtual USB manager 126. The virtual USB device 124a includes a queue buffer 128 (i.e., the queue 128) for storing and forwarding USB isochronous write packets from the virtual USB device driver 122a in cooperation with the virtual USB manager 126. The queue 128 and the virtual USB manager 126 ensure that no packet may be lost in communication with a physical USB device located on a remote client machine over the network 150. The virtual USB manager 126 also provides signals for simulating completions of packets at a standard isochronous transmission rate (e.g., 8000 times per second) to the virtual USB device driver 122a.

Figure 2:
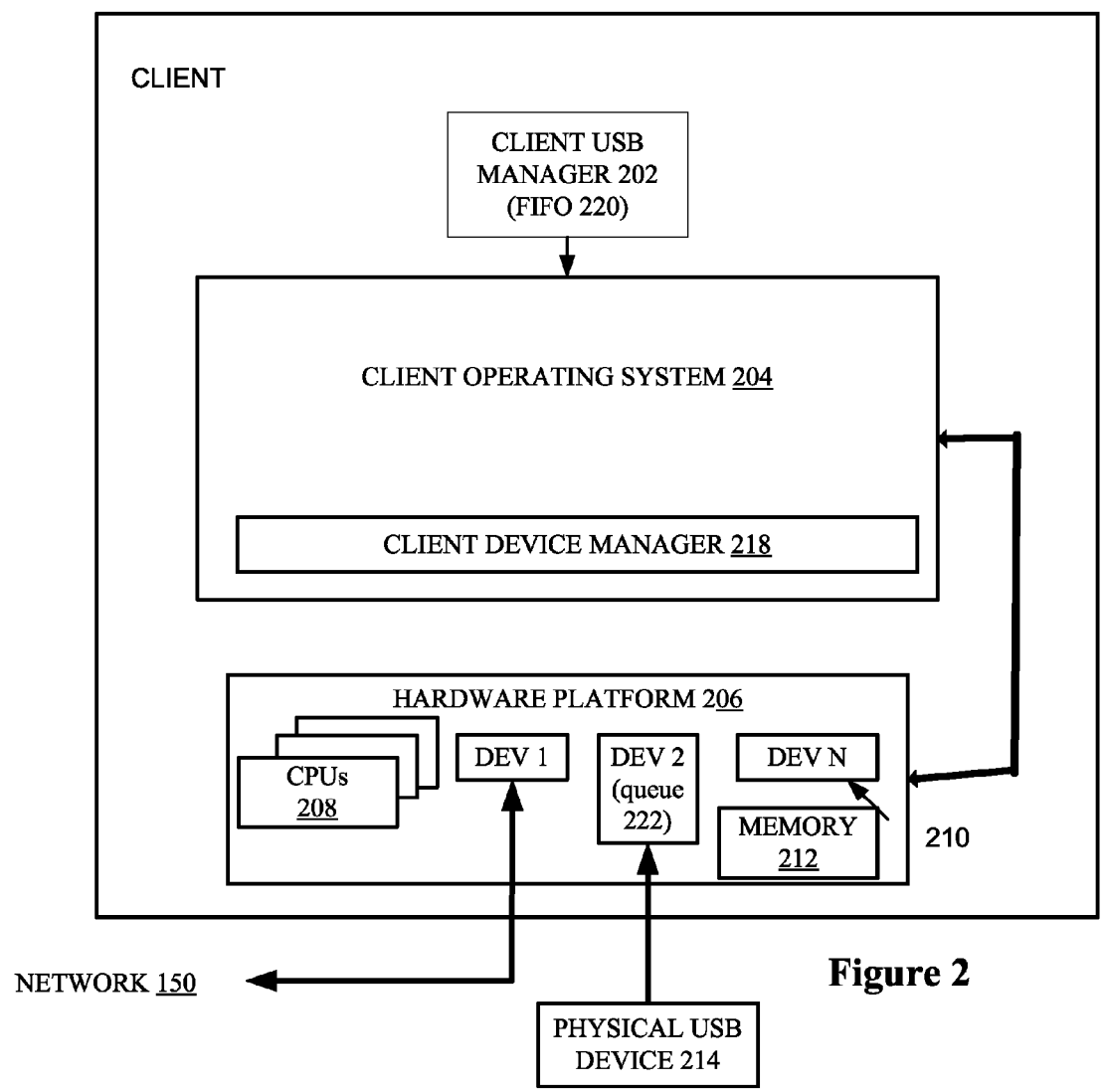
FIG. 2 is a block diagram illustrating one embodiment of one or more client computer systems (i.e., a client) configured to communicate with the host over a network, in which embodiments of the present invention may be implemented.

FIG. 2 is a block diagram illustrating one embodiment a client computer system 200 (i.e., the client 200), configured to communicate with the host 100 over the network 150, in which embodiments of the present invention may be implemented. The client 200 may include a client machine such as, for example, a server computer, a gateway computer, or any other suitable computer system that is configurable for operating as a client. The client machine comprises a client operating system 204 (i.e., a client OS 204) and a hardware platform 206. Client OS 204 may include Microsoft Windows®, Linux®, Solaris®, Mac® OS or any other suitable operating system for managing operations on the client 200.

The hardware platform 206 may include one or more central processing units (CPUs) 208, devices 210, and memory 212. The devices 210 may be comprised of one or more hardware and software devices (DEV 1-DEV N), which may be located internally and externally to the client 200. An example of the devices 210 may include a network interface card (NIC) such as an Ethernet network card (e.g., device "DEV 1") for communication over a network 150. The network 150 may be a private network (e.g., a local area network (LAN), wide area network (WAN), intranet, etc.) or a public network (e.g., the Internet).

Other examples of the devices 210 may include sound or video adaptors, photo/video cameras, printer devices, keyboards, displays, a USB host controller (e.g., DEV 2), or any other suitable device intended to be coupled to a computer system. Examples of the memory 212 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, one or more USB devices 214 may be externally connectable to the client 200 via the USB host controller (e.g., DEV 2) integrated with the client 200. In an embodiment, the USB host controller may be an integrated circuit (IC) separate from the one or more CPUs 208. In another embodiment, the USB host controller may be integrated with the one or more CPUs 208.

In an embodiment, a client USB manager application 202 (i.e., the client USB manager 202) running on the client OS 204 may execute a request to read or write data to/from the USB host controller (e.g., DEV 2), the physical USB device (s) 214, and/or a network interface controller (NIC) or a network card such as an Ethernet network card (e.g., device "DEV 1") for communication over the network 150. The network 150 may be a private network (e.g., a local area network (LAN), wide area network (WAN), intranet, etc.) or a public network (e.g., the Internet).

In one embodiment, the client USB manager 202 includes a first-in first-out buffer 220 (i.e., the FIFO 220) for receiving and storing USB isochronous write packets from the virtual USB device driver 122a in cooperation with the virtual USB manager 126. The USB host controller (e.g., DEV 2) includes a transmission queue 222 (the queue 222) for receiving and storing the USB isochronous write packets received from the client USB manager 202 and transmitting the USB isochronous write packets to the physical USB device 214. When the client USB manager 202 receives a command to prepare to receive an isochronous write stream from the virtual USB manager 126, the client USB manager allocates the FIFO 220 and a threshold number of write packets to queue into the transmission queue 222. The write packets which are queued in the transmission queue 222 are a reusable resource. The client USB manager 202 fills write packets with data from the FIFO 220, and then queues the write packets in the transmission queue 222. When the client USB controller (e.g., DEV2 of FIG. 2) has transmitted one of the write packets to the physical USB device 214, it hands the write packet back to the client USB manager 202, which then re-fills the write packet with data from the FIFO 220 and queues the write packet into the transmission queue 222. This last step is called "re-queuing."

The FIFO 220 and the client USB manager 202 ensure that at least one packet is queued in the transmission queue 222 continuously to insure that isochronous transmission to the physical USB device 214 is maintained.

Figure 3:
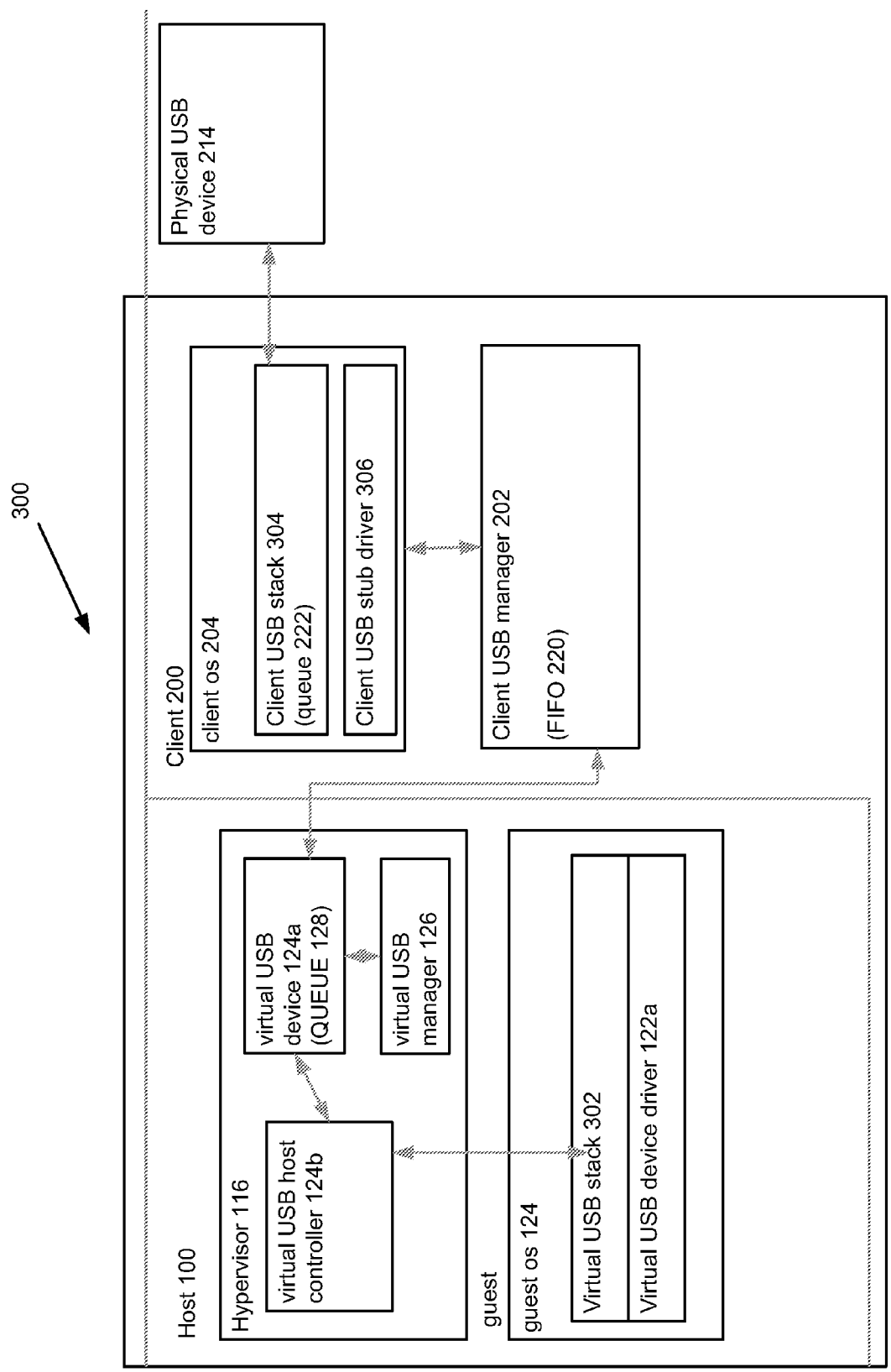
FIG. 3 is a block diagram illustrating one embodiment of a system architecture, in which embodiments may be implemented for USB data transmission between the client of FIG. 2 and the host of FIG. 1 over the network.

FIG. 3 is a block diagram illustrating one embodiment of a system architecture 300, in which embodiments of the present invention may be implemented for USB data transmission between the client 200 of FIG. 2 and the host 100 of FIG. 1 over the network 150. The host 100 is configured to emulate one or more virtual machines (i.e., the VMs 120) that include the guest OS 124 which is itself configured to include a virtual USB stack 302 for implementing the USB protocol and one or more virtual USB device driver(s) 122a for emulating the control of one or more virtual USB device(s) 124a through commands to and data received from the virtual USB device (s) 124a.

In an embodiment, the hypervisor 116 is configured to emulate the virtual USB host controller 124b and one or more virtual USB devices 124a under the control of the virtual USB manager 126 as described above corresponding to the physical USB host controller (e.g., DEV 2) and the one or more physical USB device(s) 214 externally connectable to the client 200 of FIG. 2. A client OS 204 may be configured with a client USB stack 304 for implementing the USB protocol and a client USB stub driver 306 for providing a stub API interface for receiving commands from the client USB manager 202 and data from the physical USB device 214. In one embodiment, the physical USB device 214 configured as one or more USB endpoints may communicate with the client OS 204 and ultimately the virtual USB stack 302 and virtual USB device driver(s) 122a via a client USB stack 304 and a client USB stub driver 306 integrated with the client OS 204.

In an embodiment, the client 200 may also include the client USB manager 202 running on the client OS 204 working in conjunction with the virtual USB manager 126 in the hypervisor 116 of the host OS 104 to reduce communication latency between the physical USB device(s) 214 associated with the client 200 and the virtual USB device(s) 124a located in the hypervisor 116 of the host 100. As with all USB communication protocols, a real or virtual USB device driver initiates all communications with a real or virtual USB device via a real or virtual USB host controller. In such circumstances, communication is initiated by the virtual USB device driver 122a in the guest OS 124 of the host 100 and data transferred either from virtual USB device driver 122a to the physical device(s) 214 or from the latter to the former (possibly) over the network 150 according to one of the four USB transfer types.

Diversion of USB data transfers to/from a physical USB device (e.g., the USB device 214) to/from a virtual machine (e.g., the virtual USB stack 302 and the virtual USB device driver(s) 122a) is known as "redirection." Redirection becomes more complicated and latency problems become more severe for data traffic transferred over the network 150 when a computing machine to which a physical USB device is connected (i.e., the client 200, with the host 100 acting as a server) is remotely located and separate from the host 100 on which the VM 120 is located.

For isochronous OUT (write) transactions (i.e., streams), the virtual USB device 124a in the hypervisor 116 of the host 100 may be provided with the virtual USB manager 126. The virtual USB manager 126 is configured to substantially immediately forward packets received from the virtual USB device driver 122a over the network 150 to the client USB manager 202 without waiting for the physical USB device 214 to have processed the packets.

More particularly, there is (at the USB level) no separate command to "initiate an isochronous write (OUT) transaction." As a result, when the virtual USB device driver 122 transmits the first isochronous write (OUT) packet, of what it assumed to be a stream of such packets, the virtual USB manager 126 is configured to intercept the first isochronous write (OUT) packet (and subsequent write packets) and to transmit a command to the client USB manager 202 to prepare to receive an isochronous write stream.

For isochronous OUT (write) transactions (i.e., streams), the client USB manager 202 may be provided with a first-in-first-out (FIFO) buffer 220. The FIFO 220 is configured to continually keep at least one isochronous write packet queued in the transmission queue 222 of the USB host controller (e.g., DEV 2) for delivery to the physical USB device 214. To this effect, the client USB manager 202 is configured to prepare to receive an isochronous write stream. In an embodiment, the client USB manager 202 allocates the FIFO 220 to hold buffered packets as well as a threshold number of write packets to queue into the transmission queue 222 residing in the client OS USB stack 304 (of the client USB host controller (e.g., DEV2)) for transmission to the physical USB device 214. In response, the virtual USB manager 126 is configured to transmit the initial isochronous write (OUT) packet (the one which triggered it to send the start stream command) to the client USB manager 202. Note that at this point, no communication with the physical USB device 214 has yet occurred. The first communication with physical USB device 214 occurs when the FIFO 220 is filled to a certain threshold, at which point the client USB manager 202 is configured to de-queue a first set of packets from the FIFO 220 and into the transmission queue 222 for transmission to the physical USB device 214.

When the client USB controller (e.g., DEV2 of FIG. 2) has transmitted one of the write packets to the physical USB device 214 at the standard isochronous rate, it hands the write packet back to the client USB manager 202, which fills the write packet with data from the FIFO and re-queues it into the transmission queue 222. The FIFO 220 insures that no packets are lost because of latency issues and is also configured to provide the USB device 214 with a continuous stream of data.

The client USB manager 202 is further configured to wait for the physical USB device 214 to process a write (data) packet before re-using it and filling it with the contents of another packet from the FIFO 220. Then client USB manager 202 re-queues the write packet. Unlike software associated with related USB controllers, what the client USB manager 202 is not configured to: forward an acknowledgement packet (i.e. an ACK packet) received from the physical USB device 214 to the virtual USB manager 126 that indicates that the physical USB device 214 has received the packet; wait for that ACK to reach the virtual USB stack 302; and wait for the virtual USB manager 126 to send a new data packet.

In summary, when the physical USB device 214 has processed a data packet, the client USB manager 202 is configured to the de-queue next data packet from the FIFO 220 and queues it for transmission to the physical USB device 214 in the transmission queue 222 without waiting for the virtual USB device driver 122.

Termination of the isochronous (OUT) write stream is signaled as follows. Stopping of the stream is detected by the virtual USB device manager 126 when the virtual USB device driver 122a changes a USB "alt" setting to 0, at which point the virtual USB device manager 126 is configured to transmit a "stop stream" command to the client USB manager 202. In response, the client USB manager 202 is configured to stop de-queueing packets from the FIFO 220 and queueing packets into the transmission queue 222.

More particularly, USB endpoints are grouped into so-called interfaces and interfaces have alt settings. Most interfaces may have only 1 alt setting (alt setting 0) but interfaces with isochronous endpoints have multiple alt settings. The reason for this is that the timing guarantees isochronous packets provide to USB devices and USB device drivers require reserving bandwidth to ensure these guarantees are honored. Changing the alt setting reserves a certain amount of bandwidth. Thus, when a USB device driver is finished with streaming to/from a device, it changes the alt setting back to 0 to release the reserved bandwidth. This is used to detect that the stream is terminated.

Figure 4:
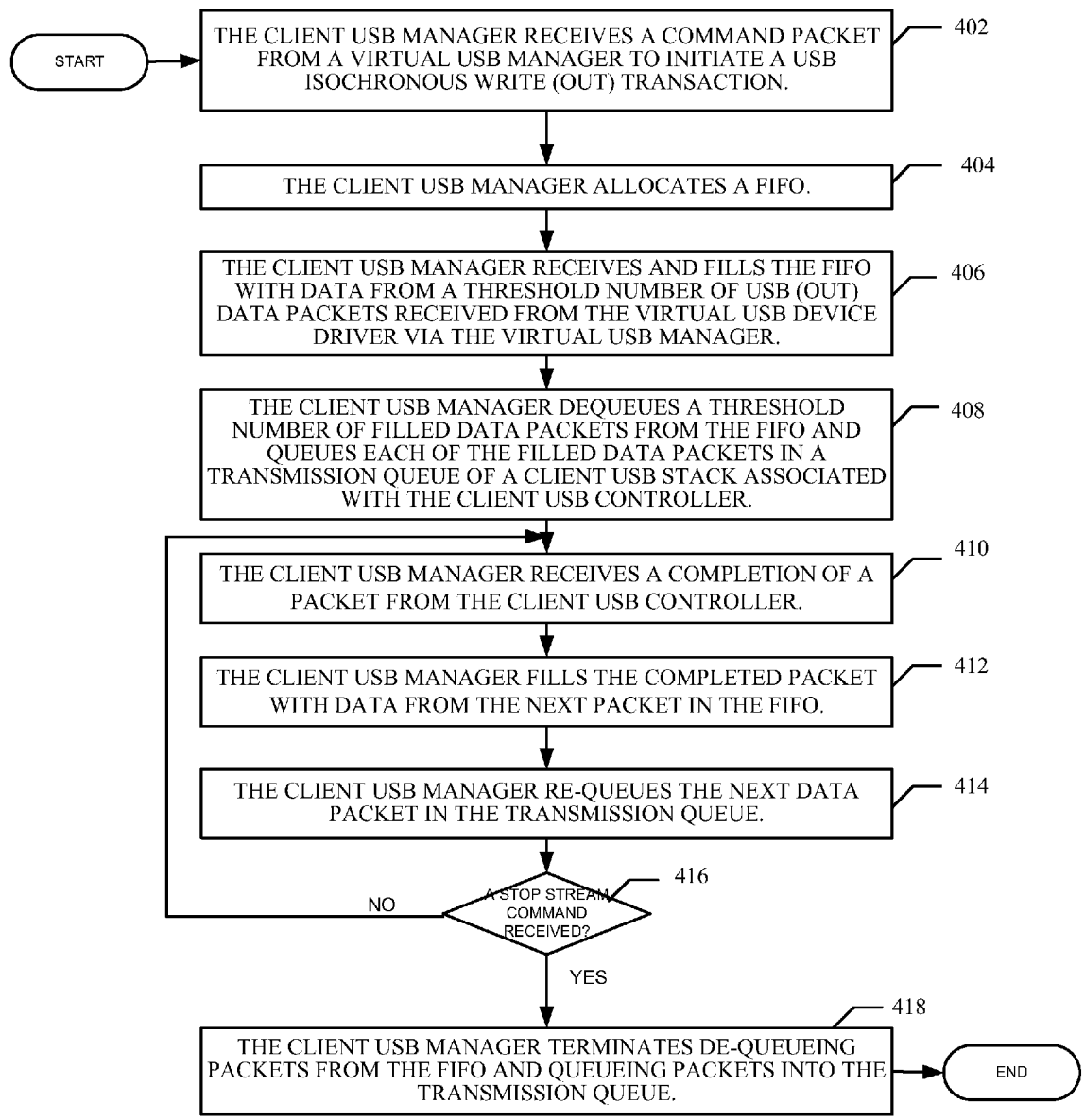
FIG. 4 is a flow diagram illustrating one embodiment of a method for conducting a hidden latency USB isochronous write (OUT) transaction between a guest USB device driver and a physical USB device.

FIG. 4 is a flow diagram illustrating one embodiment of a method 400 for conducting a hidden latency USB isochronous write (OUT) transaction between a virtual USB device driver 122a and a physical USB device (e.g. the physical USB device 214) via a virtual USB manager 126 of the hypervisor 116 and a client USB manager 202. Method 400 may be performed by processing logic (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 is performed primarily by the client USB manager 202 running on the client OS 204 of the client 200.

The virtual USB manager 126 receives a first of a stream of USB isochronous write (data) packets from the virtual USB device driver 122a via the virtual USB stack 302 to initiate an isochronous write (OUT) transaction. At block 402, the client USB manager 202 receives a command packet from the virtual USB manager 126 of the hypervisor 116 to initiate an isochronous OUT transaction. At block 404, the client USB manager 202 allocates the FIFO 220.

At block 406, the client USB manager 202 receives and fills the FIFO 220 with data from a threshold number of USB (OUT) data packets received from the virtual USB device driver 122a via the virtual USB manager 126. At block 408, the client USB manager 202 dequeues a threshold number of filled data packets from the FIFO 220 and queues each of the data packets in the transmission queue 222 of the client USB stack 304 (associated with the client USB controller (e.g. DEV2)). The USB host controller (DEV2) dequeues a data packet from the transmission queue 222 and transmits the data packet to the physical USB device 214.

At block 410, the client USB manager 202 receives a completion of a packet from the client USB controller (e.g. DEV2) (i.e., the client USB manager 202 waits for the host controller to signal it is done with a packet). At block 412, the client USB manager 202 fills the completed packet with data from the next packet in the FIFO 220. At block 414, the client USB manager 202 requeues the next packet in the transmission queue 222. In general, when the physical USB device 214 has processed a data packet, the client USB manager 202 dequeues the next data packet from the FIFO 220 and queues it for transmission in the transmission queue 222 for later transmission to the physical USB device 214 without waiting for the virtual USB device driver 122a to process a completed data packet.

Note that the client USB manager 202 does not send a signal for the completion of packets to the virtual USB manager 126. The virtual USB manager 126 independently signals completion of each of the data packets to the virtual USB device driver 122a at the standard isochronous interval without waiting for the packets to be processed by the physical USB device 214. The virtual USB device driver 122a needs to receive an acknowledgement of a continuous stream of packets in order to satisfy the isochronous transmission protocol.

At block 416, if the client USB manager 202 receives a stop stream command from the virtual USB device manager 126 as a result of the virtual USB device driver 122a changing a USB "alt" setting to 0, then at block 418, the client USB manager 202 terminates de-queueing packets from the FIFO 220 and queueing packets into the transmission queue 222; otherwise, processing returns to block 410.

In an embodiment, when a physical USB device 214 is connected to a remote client 200, the client USB manager 202 is configured to receive and transmit USB commands and data packets to and from the hypervisor 116 in the host 100 over the network 150. In another embodiment, when the physical USB device 114 is connected to the host 100 in a virtual environment as depicted in FIG. 1, the client USB manager 202 containing the FIFO 220 as well as the virtual USB manager 126 containing the queue 128 reside within the hypervisor 116 of the host OS 104. Further, the client OS 204 containing the client USB stack 304 and a client USB stub driver 306 are integrated with the host OS 104. USB data packets are passed between the virtual USB manager 126 and the FIFO 220 in the hypervisor 116 without an intervening network 150 as would be appreciated by one of ordinary skill in the art having the benefit of this disclosure.

In an embodiment, the client USB manager 202 containing the FIFO 220 is configured to resolve any problems with USB timing. The client USB manager 202 in the client 200 employs the FIFO 220 to insure that the USB device 214 receives a continuous stream of packets even if there is some jitter in the timing of the packets as they traverse the network 150 or between the physical USB device 214 in the client 200 and the virtual USB device driver 122a in the host 100.

Figure 5:
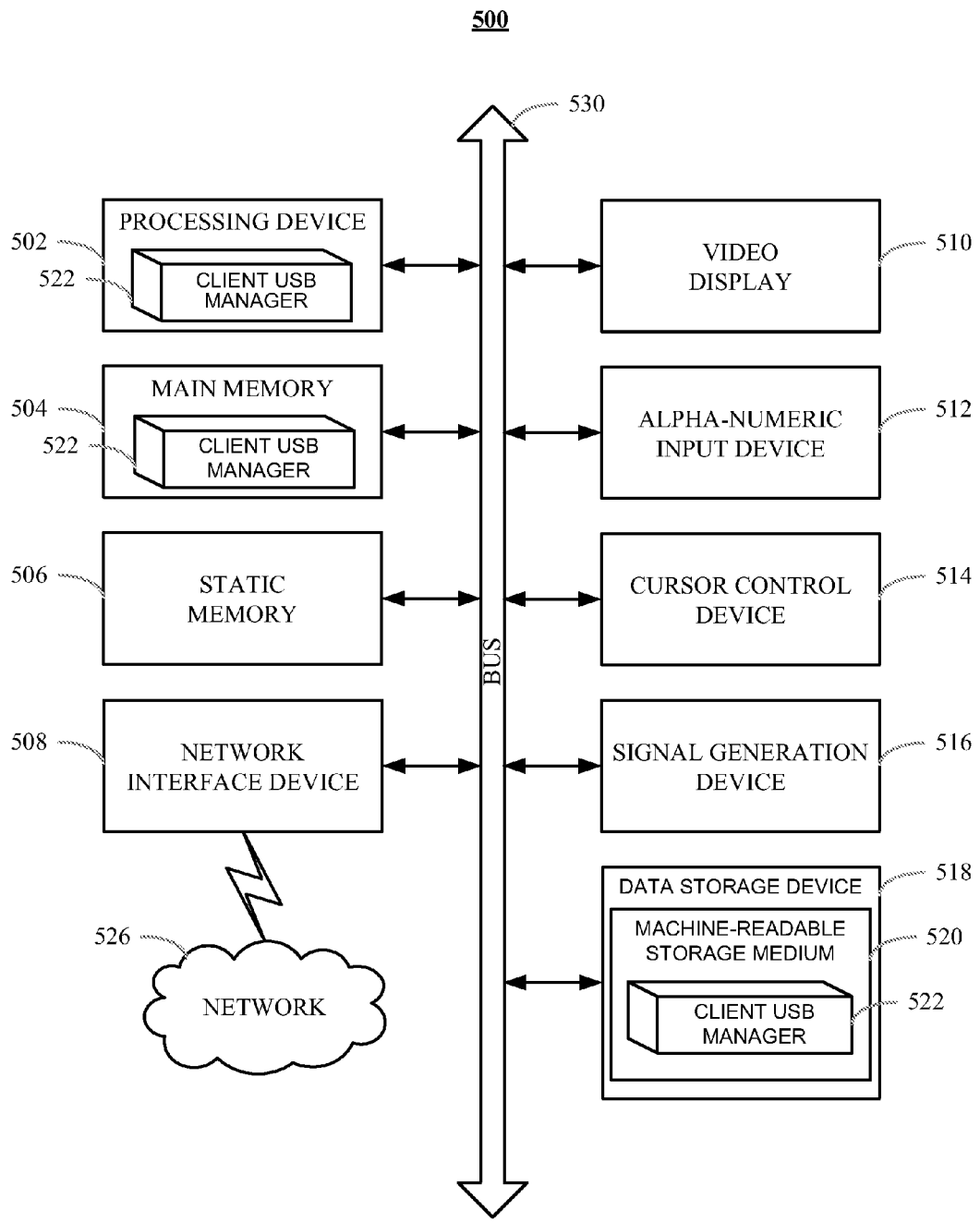
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the client USB manager 202 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions 522 (e.g., the client USB manager 202) embodying any one or more of the methodologies of functions described herein. The client USB manager 202 may also reside, completely or at least partially, within main memory 504 and/or within processing device 502 during execution thereof by computer system 500; main memory 504 and processing device 502 also constituting machine-readable storage media. The client USB manager 202 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a client computer system from a virtual Universal Serial Bus (USB) device driver of a host computer system, a first number of data packets;
   en-queuing, by the client computer system, the first number of data packets into a first-in first out buffer (FIFO);
   de-queuing, by the client computer system, a second number of data packets from the FIFO, the first number of data packets and the second number of data packets selected by the client computer system of depending on an amount of jitter and an amount of latency in a link between the virtual USB device driver and the client computer system;
   transmitting, by the client computer system, the second number of data packets to a USB device controller for transmission to a USB device; and
   in response to a completion of processing of a data packet, de-queuing and transmitting, by the client computer system, a data packet from the FIFO to the USB device controller at an interval without waiting for the virtual USB device driver.

2. The method of claim 1, wherein the data packet is transmitted by the client computer system to the USB device controller using a USB isochronous OUT transaction.

3. The method of claim 1, wherein the data packet is transmitted by the client computer system to the USB device controller at a standard USB isochronous interval.

4. The method of claim 1, further comprising receiving, by the client computer system from the virtual USB device driver, a command packet to initiate a USB isochronous OUT transaction.

5. The method of claim 4, further comprising, in response to receiving the command packet:
   allocating the FIFO; and
   filling the FIFO with the first number of data packets.

6. The method of claim 1, wherein said de-queuing and transmitting the data packet from the FIFO further comprises:
   queuing the data packet in a transmission queue associated with USB device controller.

7. The method of claim 1, further comprising receiving a stop stream command associated with the virtual USB device driver.

8. The method of claim 7, wherein the stop stream command comprises changing a USB alt setting to 0.

9. The method of claim 7, further comprising:
   terminating de-queuing data packets from the FIFO and;
   terminating transmitting data packets to the USB device controller.

10. The method of claim 1, wherein the number of data packets is received over a network from a hypervisor of the host computer system.

11. A system, comprising:
    a memory;
    a client computer system, coupled to the memory, the client computer system to:
    receive from a Universal Serial Bus (USB) device driver of a host computer system, a first number of data packets;
    en-queue the first number of data packets into a first-in first out buffer (FIFO);
    de-queue a second number of data packets from the FIFO, the first number of data packets and the second number of data packets selected by the client computer system depending on an amount of jitter and an amount of latency in a link between the virtual USB device driver and the client computer system;
    transmit the second number of data packets to a USB device controller for transmission to a USB device; and
    in response to a completion of processing of a data packet, de-queue and transmit a data packet from the FIFO to the USB device controller at an interval without waiting for the virtual USB device driver.

12. The system of claim 11, further comprising, in response to receiving the command packet:
    allocating the FIFO; and
    filling the FIFO with the first number of data packets.

13. The system of claim 11, wherein said de-queuing and transmitting the data packet from the FIFO further comprises:
    queuing the data packet in a transmission queue associated with USB device controller.

14. The system of claim 11, wherein the client computer system is further to receive a stop stream command associated with the virtual USB device driver.

15. The system of claim 14, wherein the stop stream command comprises changing a USB alt setting to 0.

16. The system of claim 11, wherein the data packet is transmitted by the client computer system to the USB device controller at a standard USB isochronous interval.

17. A non-transitory computer readable storage medium including instructions that, when executed by a client computer system, cause the client computer system to perform operations comprising:
   receiving, by the client computer system from a virtual Universal Serial Bus (USB) device driver of a host computer system, a first number of data packets;
   en-queuing, by the client computer system, the first number of data packets into a first-in first out buffer (FIFO);
   de-queuing, by the client computer system, a second number of data packets from the FIFO, the first number of data packets and the second number of data packets selected by the client computer system depending on an amount of jitter and an amount of latency in a link between the virtual USB device driver and the client computers;
   transmitting, by the client computer system, the second number of data packets to a USB device controller for processing transmission to a USB device; and
   in response to a completion of processing of a data packet, de-queuing and transmitting, by the client computer system, a data packet from the FIFO to the USB device controller at an interval without waiting for the virtual USB device driver.

18. The non-transitory computer readable storage medium of claim 17, further comprising, in response to receiving the command packet:
   allocating the FIFO; and
   filling the FIFO with the first number of data packets.

19. The non-transitory computer readable storage medium of claim 17, wherein said de-queuing and transmitting the data packet from the FIFO further comprises:
   queuing the data packet in a transmission queue associated with USB device controller.

20. The non-transitory computer readable storage medium of claim 17, further comprising receiving a stop stream command associated with the virtual USB device driver.

21. The non-transitory computer readable storage medium of claim 20, wherein the stop stream command comprises changing a USB alt setting to 0.

22. The non-transitory computer readable storage medium of claim 17, wherein the data packet is transmitted by the client computer system to the
   USB device controller at a standard USB isochronous interval.

* * * * *